Patented July 15, 1924.

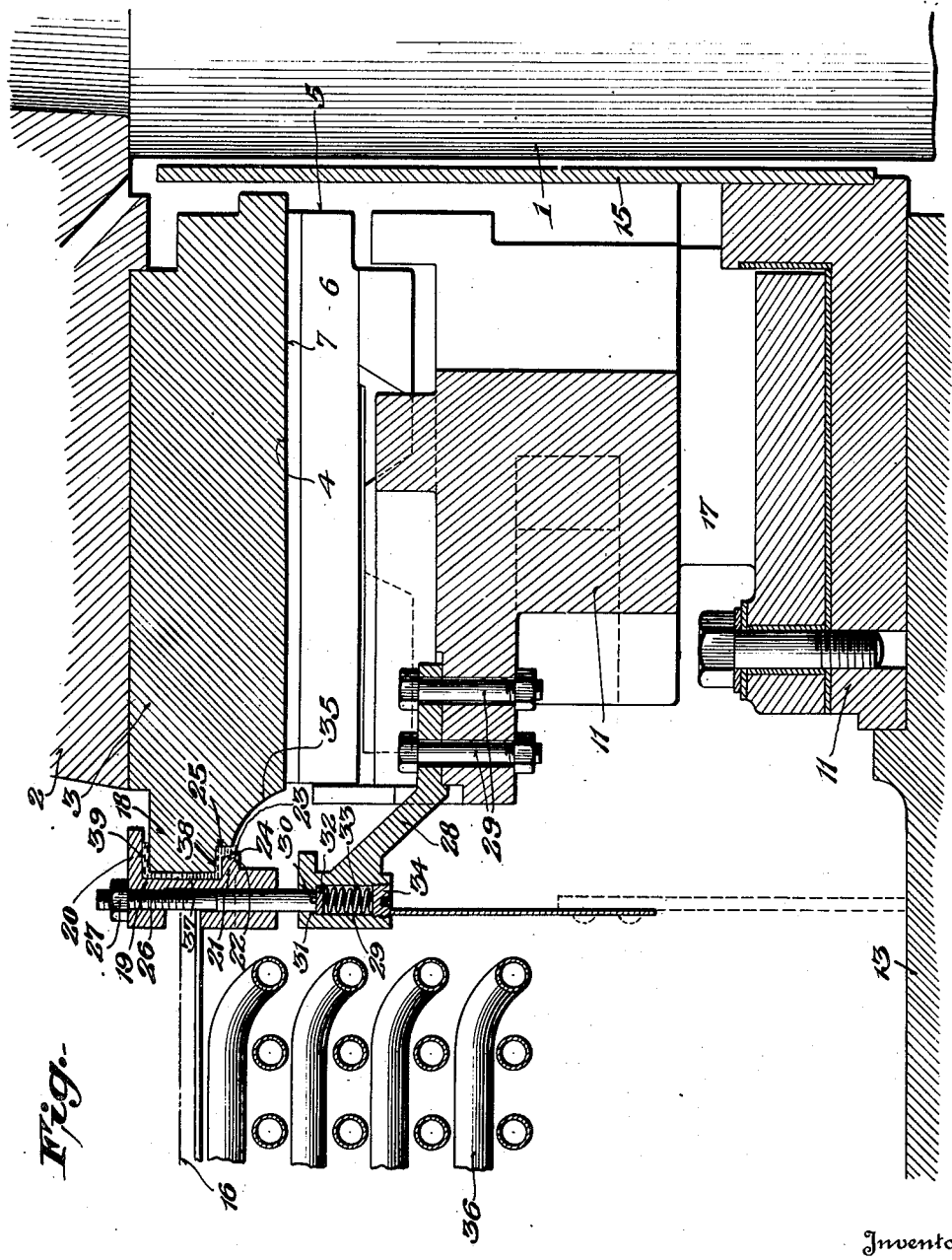

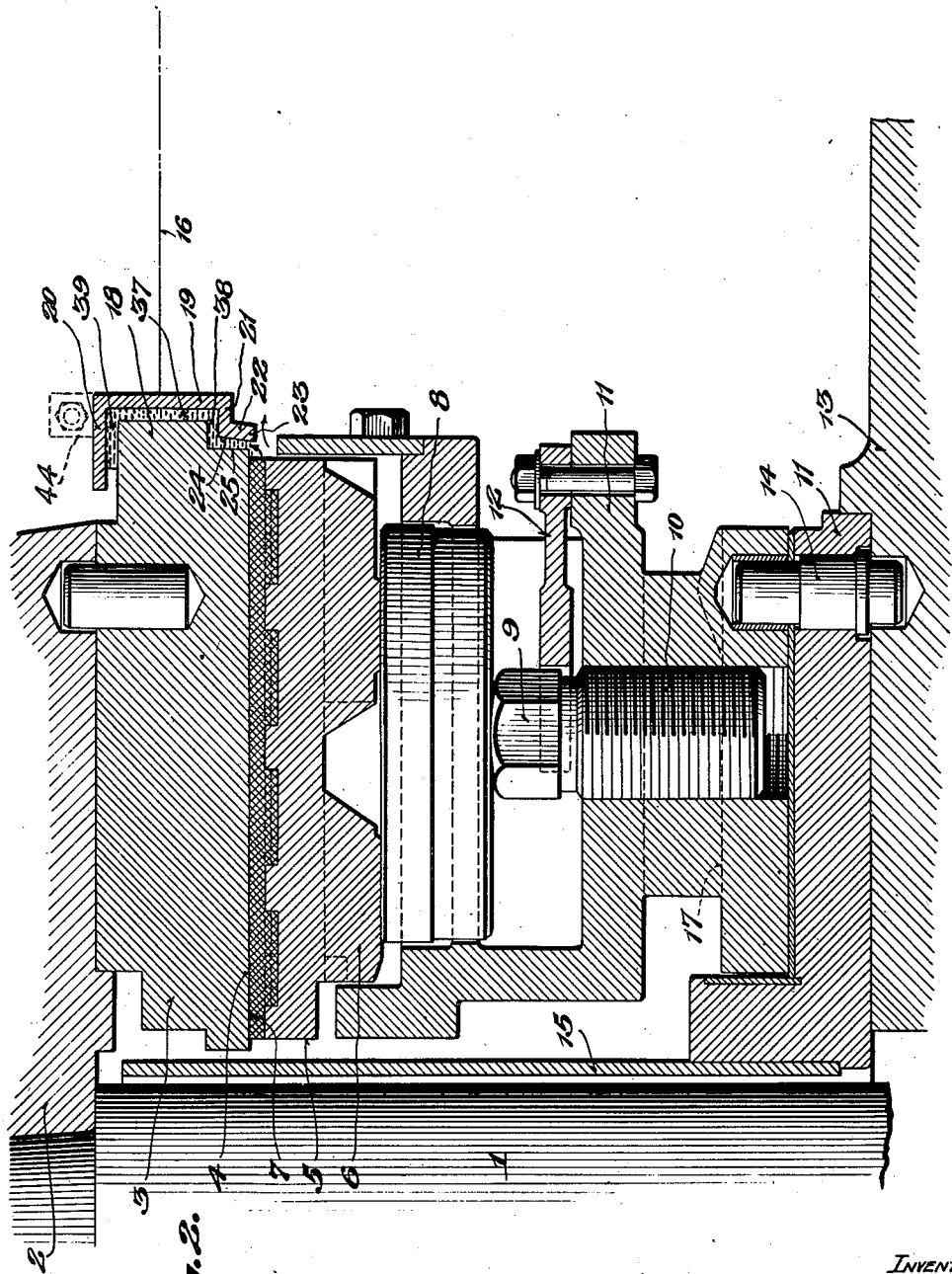

1,501,404

UNITED STATES PATENT OFFICE.

ALBERT KINGSBURY, OF GREENWICH, CONNECTICUT, AND HARRY A. S. HOWARTH, OF PHILADELPHIA, PENNSYLVANIA; SAID HOWARTH ASSIGNOR TO SAID KINGSBURY.

AIR-SEALING MEANS.

Application filed February 8, 1922. Serial No. 534,970.

*To all whom it may concern:*

Be it known that we, ALBERT KINGSBURY and HARRY A. S. HOWARTH, citizens of the United States, and residents of Greenwich, Connecticut, and Philadelphia, Pennsylvania, respectively, have invented new and useful Improvements in Air-Sealing Means, which invention is fully set forth in the following specification.

This invention relates to bearings and more particularly, to means for preventing a rotatable bearing member from churning air into oil surrounding the periphery of said member.

In thrust bearings, particularly thrust bearings for vertical shafts, it is common practice to maintain the relatively rotatable bearing surfaces immersed in oil, so that said bearing surfaces may be adequately lubricated when the bearing is in operation. When such an arrangement is employed, the rotation of the rotatable bearing member tends to set the body of oil surrounding the rotatable member into movement and, particularly when the shaft has a relatively high speed of rotation, this movement of the oil superinduced by the rotation of the rotatable bearing member may be sufficiently great adjacent the periphery of said rotatable member to cause more or less of a churning together of the air and oil—which causes bubbles of air to become entrained in the circulating oil. If any considerable quantity of air becomes mixed with the oil, the lubricating capacity of the oil is decreased—with a consequent danger of failure of the oil film between the bearing surfaces.

It is an object of this invention to provide a bearing with means cooperating with the periphery of the rotatable bearing member to prevent churning together of the air and oil owing to the rotation of said member.

Another object of this invention is to provide a rotatable bearing member with means for maintaining an air-seal of relatively air-free oil surrounding the periphery of the rotatable member.

Another object of this invention is to provide a relatively rotatable bearing member with a relatively stationary member cooperating therewith to maintain a balanced column of oil in contact with the periphery of said rotatable member by the action of centrifugal force on the oil at said periphery.

Another object of this invention is to provide a relatively rotatable bearing member with a relatively stationary member cooperating therewith to maintain a balanced column of oil in contact with the periphery of said rotatable member, together with means for adjusting said stationary member to vary said column of oil.

Other objects will appear as the description of the invention proceeds.

Stated broadly, the invention comprises, in combination with relatively rotatable bearing members and an oil well in which the bearing surfaces of said members are disposed, means cooperating with the periphery of the rotatable bearing member to prevent churning together of the air and oil, said means including a relatively stationary member slightly spaced from the periphery of the rotatable bearing member, and preferably embracing said periphery in an axial direction, so as to maintain a relatively air-free column of oil in contact with said periphery.

The invention is capable of receiving a variety of mechanical expressions two of which are shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in both figures:—

Figure 1 is a half axial section, taken between bearing shoes, of a thrust bearing for a vertical shaft embodying the present invention; and Fig. 2 is a half axial section of the same bearing, taken through a bearing shoe, but illustrating a different construction of rotatable bearing member and relation of the sealing means to the bearing surfaces.

In the form shown in each of said figures, 1 is a shaft provided in any suitable way with a thrust block 2 to which is connected in any suitable way a thrust collar 3 of any suitable construction having a bearing surface 4. Cooperating with said bearing surface 4 is a stationary bearing member 5 of any suitable construction, the same being shown as composed of a plurality of bearing segments or shoes 6 each provided with a bearing surface 7. Said bearing shoes 6 may be mounted in any suitable way, but are preferably tiltably or flexibly mounted so that they may tilt both circumferentially—to automatically create and maintain wedge-shaped oil films—and radially—so as to maintain substantially uniform bearing engagement in radial directions with the bearing surface of the thrust collar—in conformity with the principles of the bearings invented by Albert Kingsbury. In the form shown, each bearing shoe 6 is supported on a block 8, which in turn is pivotally or tiltably mounted on the spherical head 9 of a jack-screw 10 suitably threaded into the base-ring 11 and retained in adjusted position in any suitable way, as by a lock wrench 12. The base-ring 11 is suitably mounted on the frame or foundation 13, and is prevented from rotation with respect to said frame or foundation in any suitable way, as by bolts or dowel pins 14. Mounted on the base-ring 11, or the frame or foundation 13, is a sleeve 15 closely surrounding the shaft, said sleeve together with the frame or foundation 13 and an outer encircling wall (not shown) providing an oil well in which the oil is preferably maintained at a level substantially as indicated by the dot and dash line 16, so that the relatively rotatable bearing surfaces 4 and 7 are immersed in oil all of the time that the bearing is in operation. The base-ring 11 is also preferably provided with passages 17 to permit the oil to circulate from the body of the oil in the well into operative relation with the relatively rotatable bearing surfaces.

While the construction of the relatively rotatable bearing members has thus been shown and described with considerable particularity, it is to be expressly understood that the invention is not limited thereto, as the same is to be taken as typical of any suitable form of relatively rotatable bearing members, the details of construction of said bearing members constituting no part of the present invention.

As the rotatable thrust collar 3 projects into the oil in the well, its rotation tends to set the oil in contact therewith into more or less violent movement depending upon the speed of rotation of said collar. This movement of the oil induced by the rotation of the thrust collar, particularly when the thrust collar has a relatively high speed of rotation, tends to cause a churning together of the air and oil at the free surface of the oil in proximity to the periphery of said thrust collar. In conformity with the present invention, means are provided to cooperate with the periphery of said thrust collar and prevent this churning together of the air and oil. While said means may take a variety of forms, it preferably comprises a relatively stationary separating member between the body of the oil in the well and the periphery of the rotatable bearing member, said stationary member being slightly spaced from the periphery of the rotatable member so that a relatively air-free column of oil acting as an air-seal may be formed between said periphery and said stationary member. In the construction illustrated, the thrust collar 3 is extended radially beyond the periphery of the bearing surfaces 4 and 7 so as to provide a circumferential ledge or projection 18 having opposed surfaces at an angle to the axis of the bearing, and mounted in cooperation therewith but slightly spaced therefrom is a relatively stationary channel-shaped ring 19 which projects on opposite sides of said ledge or projection 18 as shown at 20 and 21 respectively. Projecting downwardly from the side 21 of said ring 19 is a flange 22 which preferably extends a short distance below the edge of the opposed surface 25 of the thrust collar, as shown at 23, and which also is desirably provided with a coned inner surface 24 which flares slightly away from said opposed surface 25 of the thrust collar.

Said relatively stationary member or ring 19 may be mounted in any suitable way, but is preferably adjustable in an axial direction so as to vary the width of the spaces between said member and the projection or ledge 18 on the opposite sides thereof. To this end the ring 19 is shown as provided with a plurality of bolts 26 threaded into apertures in said ring and provided with lock nuts 27 on their upper projecting ends. At their lower ends, said bolts 26 cooperate with an abutment of any suitable construction, shown as formed by a corresponding number of brackets 28 projecting from and suitably secured to the base-ring 11, as by the bolts 29. In order that the ring 19 may move downwardly without breaking the parts in case the babbitt should wipe, this abutment for the bolts 26 may be so constructed as to be substantially unyielding for the purposes of adjustment of the ring 19 but to yield in response to abnormal pressures. To this end the bolts 26, in the form shown, react against pre-tensioned springs 33 mounted in apertures 29 in the brackets 28, each of said apertures having its upper portion 30 of reduced diameter so as to provide an internal shoulder 31. Mounted in each of said apertures 29 and in engagement with the shoulder 31 is a disk or plunger 32 on which the end of the corresponding bolt 26 bears, said disk or plunger being maintained in engagement with its shoulder 31 by the corresponding spring 33 which, in turn, is retained in its aperture 29 by a threaded plug 34. The springs 33 are so tenesioned that they retain the disks or plungers 32 against their shoulders 31 with a pressure which is several times that required for adjusting the bolts 26 to position the ring 19 in the desired relation to the periphery of the thrust collar 3. Therefore, each of the bolts 26 has a relatively fixed abutment with respect to the bearing parts for purposes of adjustment of the ring 19 but, in case the babbitt should wipe and the thrust collar 3 should move bodily downward and carry the ring 19 therewith, the springs 33 could yield under the abnormal pressure to which they would be subjected by the bolts 26, and the ring 19 would not be injured.

The ring 19 may also, for convenience of assembly and disassembly be made in two or more sections and united in operative relation to the thrust collar 3 by means of bolts mounted in flanges on the ring sections as shown at 44 in dotted lines in Fig. 2.

As the rotatable bearing member rotates, the oil adjacent thereto is set in motion under the action of centrifugal force. When the thrust collar is provided with a curved surface 35 or other suitable means to direct a rapid circulation of oil through a cooling coil, as shown at 36 in Fig. 1, the oil has an upward and outward spiral motion and the depending portion 23 on the flange 22 of the ring 19, which projects a short distance below the upper edge of the curved surface 35, intercepts some of the oil and directs it into the annular space between the periphery of the thrust collar and the ring 19. When the collar is not provided with an oil-directing surface or other means for circulating the oil into heat-interchanging relation with a cooling coil, the depending portion 23 of the flange 22 may be brought into close proximity to the outer periphery of the bearing surfaces and project a slight distance below the plane of said surfaces, as shown in Fig. 2, where it will intercept some of the oil moving outwardly between said bearing surfaces and direct it into the annular space between the thrust collar and the ring 19.

When the shaft is stationary, the oil in the annular chamber or space 37 between the periphery of the thrust collar 3 and the stationary ring 19 has substantially the same level as the oil in the body of the well. When the shaft is set in rotation, however, centrifugal force acting on the oil in the radial chamber or space 38 between the inwardly directed portion 21 of the ring 19 and the lower face of the projection 18 on the thrust collar 3 tends to cause the oil to flow radially outward, which action is aided and increased by the action of the depending flange 22 which intercepts and directs into said annular space some of the oil set in motion by the rotating thrust collar. Accordingly, the oil rises in the annular chamber or space 37 and, if the axial height of the projection 18 above the level 16 of the oil in the well is not excessive, the oil will flow into the annular chamber or space 39 between the inwardly directed portion 20 of the ring 19 and the upper surface of the projection 18 on the thrust collar, in which last-named chamber centrifugal force tends to oppose the radial inward movement of the oil. Hence the oil will rise above the level of the oil in the well in the annular space between the ring 19 and the periphery of the thrust collar and flow into that portion of this space which is on the opposite side of said collar from that immersed in the oil until the column of oil in the annular spaces 37, 38 and 39 is balanced under the action of centrifugal force and gravity acting on the oil in said annular spaces. The periphery of the thrust collar is therefore embraced in an axial direction by a relatively air-free column of oil which is separated from the body of the oil in the well by the stationary ring 19, and this column of oil acts as an air-seal to prevent the air being churned into the oil at the periphery of the thrust collar. Moreover, the action of centrifugal force on the air and oil at the only surface at which they come in contact, to wit the end of the column in the annular chamber 39, is to separate the air from the oil owing to their difference in specific gravity, so that the column of oil which embraces the periphery of the thrust collar not only acts as an air-seal for the periphery of said thrust collar, but also tends to separate any air, which becomes entrained in the oil, by the action of centrifugal force on the air and oil in the annular chamber 39.

The flange 22 may be made to project any suitable distance below the upper periphery of the oil-directing surface 35, or the plane of bearing engagement, so as to produce the desired head on the oil flowing into the annular space between the ring 19 and the periphery of the thrust collar. A sixteenth of an inch projection has been found to be suitable for bearings of relatively large size. The angle of flare of said flange 22 may also be suitably selected to facilitate the flow of oil into said annular chamber between the ring 19 and the periphery of the thrust collar. It will be apparent that, if the extent of projection of the flange 22 be relatively large and the angle of the face 24 be relatively small, a relatively large head will be produced in the short vertical column of oil leading to the annular chamber 38 heretofore referred to. So far as the operation of the balanced column of oil extending on the opposite sides of the projection 18 of the thrust collar is concerned, the height of the chamber 37 may be made as small as desired, but as the level of the oil in the well is preferably maintained at a height so that it always intersects the vertical peripheral surface of the projection 18, it is desirable that this last-named surface be made relatively long in an axial direction so as to provide for variations in the level of the oil in the well without the oil rising to the height of the chamber 39 or falling to the level of the chamber 38.

By adjusting the position of the ring 19 with respect to the projection 18, the width in an axial direction of the chambers 38 and 39 may be considerably varied. As the head tending to raise the oil between the ring 19 and the periphery of the collar varies with the speed of rotation of the shaft and the radial and axial dimensions of the chambers 38 and 39, considerable variation in the head tending to raise the oil in said chambers may be obtained by adjusting the member 19 axially with respect to the projection 18 to reciprocally increase or decrease the axial width of said chambers 38 and 39. Therefore, the provision for adjustment of the ring 19 enables the proper head to be obtained on the oil for a variety of different speeds of rotation of the rotatable bearing member.

In adjusting said ring 19, the bolts 26 are rotated to vary the position of the ring 19 to the desired extent and, during such adjustment, the disks 32, retained in engagement with the shoulders 31 by the springs 33, constitute a relatively rigid and fixed abutment for the said bolts. If the babbitt should wipe, however, and the shaft move axially, causing the thrust collar to exert an abnormal pressure on the member 19 and bolts 26, the springs 33 can give under the excess pressure and danger of breakage of the parts thereby avoided.

It will therefore be perceived that the relatively rotatable bearing member has been provided with means which prevents churning together of the air and oil at the periphery of said member by providing a separating partition between the body of the oil in the well and the periphery of the rotatable bearing member, whereby a relatively narrow annular chamber is formed between said means and the periphery of said rotatable member in which the oil tends to rise as a result of the rotation of said member to form a relatively air-free body of oil that not only seals the periphery of said rotatable member against the admission of air to the body of oil in the well, but also forms a balanced column, of generally U-shaped formation, which embraces the periphery of the rotatable bearing member in an axial direction and, extending on opposite sides thereof, aids exclusion of air from the oil by the action of centrifugal force.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art, while certain features thereof are capable of use without other features thereof. Changes may also be made in the details of construction, arrangement, and proportion of parts without departing from the spirit of this invention. While the invention has been shown as embodied in a bearing employing flexibly or tiltably mounted bearing segments, it is to be understood that the invention is not restricted thereto, as it is capable of application to bearings employing bearing members of other construction. Nor is the invention limited to bearings for vertical shafts. Reference is therefore to be had to the claims hereto appended for a definition of the limits of the invention.

What is claimed is:—

1. In a bearing, in combination with relatively rotatable bearing members and an oil well in which the bearing surfaces of said members are disposed, means cooperating with the periphery of the rotatable bearing member to maintain a radially-narrow layer of oil in contact with the periphery of said member substantially throughout its axial width and prevent churning together of the air and oil.

2. In a bearing, in combination with relatively rotatable bearing members and an oil well in which the bearing surfaces of said members are disposed, a stationary ring cooperating with the periphery of the rotatable bearing member to form a radially narrow layer of oil in which the peripheral surface of said member is immersed during its rotation to prevent churning together of the air and oil.

3. In a bearing, in combination with relatively rotatable bearing members and an oil well in which the bearing surfaces of said members are disposed, means embracing the periphery of the rotatable bearing member in an axial direction and cooperating therewith to maintain a relatively air-free body of oil in contact with said periphery.

4. In a bearing, in combination with relatively rotatable bearing members and an oil well in which the bearing surfaces of said members are disposed, means cooperating with the periphery of the rotatable bearing member to form a balanced column of oil extending on opposite sides thereof.

5. In a bearing, in combination with relatively rotatable bearing members and an oil well in which the bearing surfaces of said members are disposed, a channel-shaped ring spaced from but embracing the periphery of the rotatable bearing member in an axial direction to separate said periphery from the body of oil in said well.

6. In a bearing, in combination with relatively rotatable bearing members and an oil well in which the bearing surfaces of said members are disposed, means cooperating with the periphery of the rotatable bearing member and spaced therefrom to maintain an approximately U-shaped column of oil in contact with said periphery while said member is rotating.

7. In a bearing, in combination with relatively rotatable bearing members and an oil well in which the bearing surfaces of said members are disposed, a stationary ring embracing the periphery of the rotatable bearing member in an axial direction but spaced therefrom to maintain an approximately U-shaped column of oil in contact with said periphery when said member is rotating.

8. In a bearing, in combination with relatively rotatable bearing members and an oil well in which the bearing surfaces of said members are disposed, a stationary ring embracing the periphery of the rotatable bearing member in an axial direction but spaced therefrom to retain oil in contact therewith.

9. In a bearing, in combination with relatively rotatable bearing members and an oil well in which the bearing surfaces of said members are disposed, a stationary channel-shaped ring cooperating with the periphery of the rotatable bearing member to form a balanced column of oil extending on opposite sides thereof.

10. In a bearing, in combination with relatively rotatable bearing members and an oil well in which the bearing surfaces of said members are disposed, a stationary member spaced from the periphery of the rotatable bearing member to form a narrow annular chamber in which the oil will rise above the level of the oil in the well and form an air-seal for the periphery of said member when said member is rotating.

11. In a bearing, in combination with relatively rotatable bearing members and an oil well in which the bearing surfaces of said members are disposed, a stationary channel-shaped member surrounding the periphery of the rotatable bearing member to separate said periphery from the body of oil in said well.

12. In a bearing, in combination with relatively rotatable bearing members and an oil well in which the bearing surfaces of said members are disposed, a stationary member surrounding the periphery of the rotatable bearing member to separate said periphery from the body of the oil in said well, said stationary member being spaced from said periphery to form a narrow annular chamber in which the oil will rise when said member is rotating to form an air-seal for said periphery.

13. In a bearing, in combination with relatively rotatable bearing members and an oil well in which the bearing surfaces of said members are disposed, a stationary member spaced from the periphery of the rotatable bearing member to form a narrow annular chamber in which the oil will rise above the level of the oil in the well to the opposite side of said member whereby centrifugal force tends to separate air from the oil at said periphery when said member is rotating.

14. In a bearing, in combination with relatively rotatable bearing members and an oil well in which the bearing surfaces of said members are disposed, a stationary member spaced from the periphery of the rotatable bearing member and provided with an extension to direct oil into the space between said member and periphery.

15. In a bearing, in combination with relatively rotatable bearing members and an oil well in which the bearing surfaces of said members are disposed, a stationary member spaced from the periphery of the rotatable bearing member and forming therewith a flaring inlet to the space between said member and periphery.

16. In a bearing, in combination with relatively rotatable bearing members and an oil well in which the bearing surfaces of said members are disposed, a stationary member spaced from the periphery of the rotatable bearing member and having an extension for directing the oil into the space between said member and periphery, said member forming with said periphery a flared inlet to said space.

17. In a bearing, in combination with relatively rotatable bearing members and an oil well in which the bearing surfaces of said members are disposed, a stationary member extending from the oil in said well in spaced relation to the periphery of the rotatable bearing member, said stationary member also extending in spaced relation to a portion of the rotatable member at an angle to the axis of said member beneath the surface of the oil, whereby centrifugal force causes the oil to flow into the space between said stationary member and rotatable bearing member.

18. In a bearing, in combination with relatively rotatable bearing members and an oil well in which the bearing surfaces of said members are disposed, a stationary member extending from the oil in said well in spaced relation to the periphery of the rotatable bearing member, said member also extending in spaced relation to a portion of the rotatable member at an angle to the axis of said member above the surface of the oil, whereby oil rises in the space between said stationary member and rotatable bearing member, and centrifugal force tends to separate air from the oil in said space.

19. In a bearing, in combination with relatively rotatable bearing members and an oil well in which the bearing surfaces of said members are disposed, a stationary member extending from the oil in said well in spaced relation to the periphery of the rotatable bearing member, said member also extending in spaced relation to portions of the rotatable member at an angle to the axis of said member above and below the surface of the oil, whereby oil will rise in the space between said stationary member and rotatable bearing member and balanced columns be formed in the portions of said space at an angle to the axis of the rotatable member.

20. In a bearing, in combination with relatively rotatable bearing members and an oil well in which the bearing surfaces of said members are disposed, a stationary member spaced from but embracing in an axial direction the periphery of the rotatable bearing member, and means for adjusting said stationary member with respect to said periphery.

21. In a bearing, in combination with relatively rotatable bearing members and an oil well in which the bearing surfaces of said members are disposed, a stationary member spaced from but embracing in an axial direction the periphery of the rotatable bearing member to maintain a balanced column of oil on opposite sides thereof, and means for adjusting the thickness of said column of oil.

22. In a bearing, in combination with relatively rotatable bearing members and an oil well in which the bearing surfaces of said members are disposed, a stationary member spaced from but embracing in an axial direction the periphery of the rotatable bearing member, elements for adjusting the position of said stationary member, and an abutment cooperating with said adjustable elements and yieldable under an abnormal pressure.

23. In a bearing, in combination with relatively rotatable bearing members and an oil well in which the bearing surfaces of said members are disposed, a stationary member spaced from but embracing in an axial direction the periphery of the rotatable bearing member, elements for adjusting the position of said stationary member, an abutment with which said elements cooperate, and springs on which said abutment is mounted.

24. In a bearing, in combination with relatively rotatable bearing members and an oil well in which the bearing surfaces of said members are disposed, a stationary member spaced from but embracing in an axial direction the periphery of the rotatable bearing member, elements for adjusting the position of said stationary member, an abutment with which said elements cooperate, and pretensioned springs on which said abutment is mounted to yield under an abnormal load.

25. In a bearing, in combination with relatively rotatable bearing members and an oil well in which the bearing surfaces of said members are disposed, a stationary member spaced from but embracing in an axial direction the periphery of the rotatable bearing member, and means to adjust said stationary member axially with respect to said rotatable member.

26. In a bearing, in combination with relatively rotatable bearing members and an oil well in which the bearing surfaces of said members are disposed, a stationary member spaced from the periphery of the rotatable member and extending on opposite sides thereof, and means for adjusting the width of the portions of the space between said stationary member and rotatable member which extend on opposite sides of said rotatable member.

27. In a bearing, in combination with relatively rotatable bearing members and an oil well in which the bearing surfaces of said members are disposed, a channel-shaped member cooperating with the periphery of said rotatable bearing member to maintain a relatively air-free body of oil in contact therewith.

28. In a bearing, in combination with relatively rotatable bearing members and an oil well in which the bearing surfaces of said members are disposed, means cooperating with the periphery of said rotatable bearing member to form a narrow chamber into which oil is forced by centrifugal action to form an air-seal for said periphery.

29. In a bearing, in combination with relatively rotatable bearing members and an oil well in which the bearing surfaces of said members are disposed, means cooperating with the periphery of said rotatable bearing member to form a narrow chamber which is filled with oil by the rotation of said member and from the oil in which centrifugal force tends to exclude the air.

30. In a bearing, in combination with relatively rotatable bearing members and an oil well in which the bearing surfaces of said members are disposed, an annular member cooperating with the periphery of said rotatable bearing member to form a radially-narrow chamber which is filled with oil by the rotation of said member.

31. In a bearing, in combination with relatively rotatable bearing members and an oil well in which the bearing surfaces of said members are disposed, an annular member separating the oil in said well from the periphery of said rotatable bearing member and cooperating with said periphery to form a relatively air-free body of oil in which said periphery is immersed.

32. In a bearing, in combination with relatively rotatable bearing members and an oil well in which the bearing surfaces of said members are disposed, said rotatable bearing member being provided with means to effect a rapid circulation of oil in said well, means cooperating with the periphery of said rotatable member to prevent churning together of the air and oil under the action of said last-named means.

33. In a bearing, in combination with relatively rotatable bearing members and an oil well in which the bearing surfaces of said members are disposed, said rotatable bearing member being provided with means to effect a rapid circulation of oil in said well, a stationary ring separating the periphery of said rotatable member from the oil in said well and providing a narrow space between said ring and periphery in which the oil forms an air-seal.

34. In a bearing, in combination with relatively rotatable bearing members and an oil well in which the bearing surfaces of said members are disposed, said rotatable bearing member being provided with means to effect a rapid circulation of oil in said well, a stationary channel-shaped ring cooperating with the periphery of said rotatable bearing member and providing therewith a radially-narrow oil chamber forming an air-seal.

35. In a bearing, in combination with relatively rotatable bearing members and an oil well in which the bearing surfaces of said members are disposed, said rotatable bearing member being provided with means to effect a rapid circulation of oil in said well, a ring cooperating with the periphery of said rotatable bearing member to form a balanced column of oil embracing said periphery in an axial direction.

In testimony whereof, we have signed this specification.

ALBERT KINGSBURY.
HARRY A. S. HOWARTH.